United States Patent [19]

Haindl

[11] 4,097,026

[45] Jun. 27, 1978

[54] APPARATUS FOR MIXING A BASIC LIQUID SUBSTANCE WITH OTHER MEDIA

[75] Inventor: Karel Haindl, Prague, Czechoslovakia

[73] Assignee: Vyzkumny ustav vodohospodarsky, Prague, Czechoslovakia

[21] Appl. No.: 584,250

[22] Filed: Jun. 6, 1975

[30] Foreign Application Priority Data

Jan. 24, 1975 Czechoslovakia ............... 508-75

[51] Int. Cl.² ............................................. B01F 5/02
[52] U.S. Cl. ................................ 366/165; 366/101; 366/174; 366/336
[58] Field of Search .............. 259/18, 4 R, 60, 95

[56] References Cited

U.S. PATENT DOCUMENTS

| | | | |
|---|---|---|---|
| 1,127,275 | 2/1915 | Pharo | 259/60 |
| 3,086,538 | 4/1963 | Voltz | 259/95 |
| 3,386,182 | 6/1968 | Lippert | 259/18 |
| 3,647,188 | 3/1972 | Solt | 259/4 R |
| 3,661,364 | 5/1972 | Lage | 259/95 |
| 3,662,780 | 5/1972 | Marsh | 259/18 |
| 3,762,689 | 10/1973 | Hege | 259/95 |
| 3,774,885 | 11/1973 | Logvihenko et al. | 259/1 R |
| 3,799,508 | 5/1974 | Arnold et al. | 259/4 R |
| 3,826,474 | 7/1974 | Pareja | 259/95 |
| 3,926,787 | 12/1975 | Gay | 259/18 |

Primary Examiner—Richard E. Aegerter
Assistant Examiner—L. Footland
Attorney, Agent, or Firm—Burgess, Ryan and Wayne

[57] ABSTRACT

A baffle transforms a pressure stream of basic liquid into an annular flow with a hollow core, filled with another medium. By increasing the pressure in the discharge part of the mixer the liquid and the medium are thoroughly mixed and the mixture introduced into a container, to produce turbulent motion in the bulk of liquid.

11 Claims, 9 Drawing Figures

APPARATUS FOR MIXING A BASIC LIQUID SUBSTANCE WITH OTHER MEDIA

BACKGROUND OF THE INVENTION

The present invention relates to an, apparatus for, mixing liquids, gases, liquids with gases, aerosols; solid substances and the like in a container, the mixing being assisted by the mixing effect of the so-called "ring jump in the liquid stream," a term which will be fully explained later.

The invention may be used in technological processes, for the purification and treatment of water, for mixing liquid and gaseous chemicals with a basic liquid, if required under simultaneous enrichment with gas, for the desinfection and sterilization of water with ozone or chlorine, for the aeration of liquids, for the degassing of water and elimination of undesired compounds therefrom, for the purification of waste water from towns, industrial and mining plants, for activated sludge processes, in chemical, paper, cellulose and pharmaceutical industry, in mineral oil refineries, in fermentation processes, in biological engineering, for mixing a mixture of gas and powder or dust with a liquid and for further similar purposes.

In technological practice it is frequently required to enrich a liquid intensely with a gas, to mix thoroughly a gas with a liquid or to mix a liquid with particles of solid substances.

For the enrichment of a liquid with gas a variety of processes have heretofore been used, such as sprinkling, spraying, agitating the liquid surface, mixing by mechanical mixers, bubbling through, suction, blowing the gas into the liquids with blowers or compressors and the like. The majority of these processes have a low efficiency and many disadvantages in operation, as well as a high consumption of mechanical energy, frequent failures, such as clogging of nozzles, or porous plates, break-downs of blowers or compressors and in addition an undesirable cooling of the liquid and the like. It is a further drawback that the mixing appliances usually take up a considerable space.

SUMMARY OF THE INVENTION

It is an object of the invention to provide an apparatus capable of a very high mixing effect with a minimum consumption of energy. The invention utilizes for this purpose a phenomenon occurring when a liquid is passed in a ring-shaped or at least partially ring-shaped space along the walls of a conduit and the substance, either a gas, liquid or particles of solid substance to be mixed with the liquid, are fed into the conduit in front of the transition of the annular space into the full profile of the conduit, in which the pressure of the flowing mixture then increases. This phenomenon is called "ring jump in the liquid stream." According to the invention this phenomenon is used in combination with a novel arrangement of the mixing members.

The apparatus for mixing liquids, gases, liquids with gases, aerosols, solid substances and the like in a container, using the mixing effect of the ring jump in the liquid stream according to the invention producer ring jump in the stream of the basic liquid and introduces the substance to be mixed with the liquid in front of the transition of said ring jump into the flow through the full profile, whereupon the produced mixture is passed into the liquid in the container.

According to the essential feature of the apparatus at least one mixer is connected to a source of a basic pressure liquid, said mixer comprising means producing said ring jump in the liquid stream, a tube for the supply of the substance to be mixed with said basic liquid leading into said means, while the tubular body of the mixer leads into the container.

According to a further embodiment of the invention a source of pressure liquid is arranged in the container or in its vicinity; connected to this source are one or more supply pipes, each of them leading to a mixer comprising a tubular body. The latter houses means producing said ring jump, which is connected to a pipe for the supply of the substance to be mixed with the basic liquid, said tubular body leading to the container bottom, where it opens into a tubular piece open at both ends and inclined in upward direction.

In a modified arrangement of the invention the tubular body of the mixer is placed outside the container and leads into the interior of the container near its bottom, where it is provided with a mouthpiece directed in tangential direction towards the peripheral wall of the container and under an upward inclination.

According to a further modification the container has the shape of a longitudinal trough, housing a plurality of juxtaposed mixing means, the tubular body thereof extending towards the bottom of the container and under an inclination relative to the longitudinal axis of trough-shaped container, in order to produce a whirling or turbulent flow, proceeding helically in the direction of said axis.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawings.

BRIEF DESCRIPTION OF THE DRAWINGS

The invention will be explained on hand of the accompanying drawings, showing several embodiments of the apparatus according to the invention and elucidating the principle of the ring jump in the liquid stream.

Figure 1:
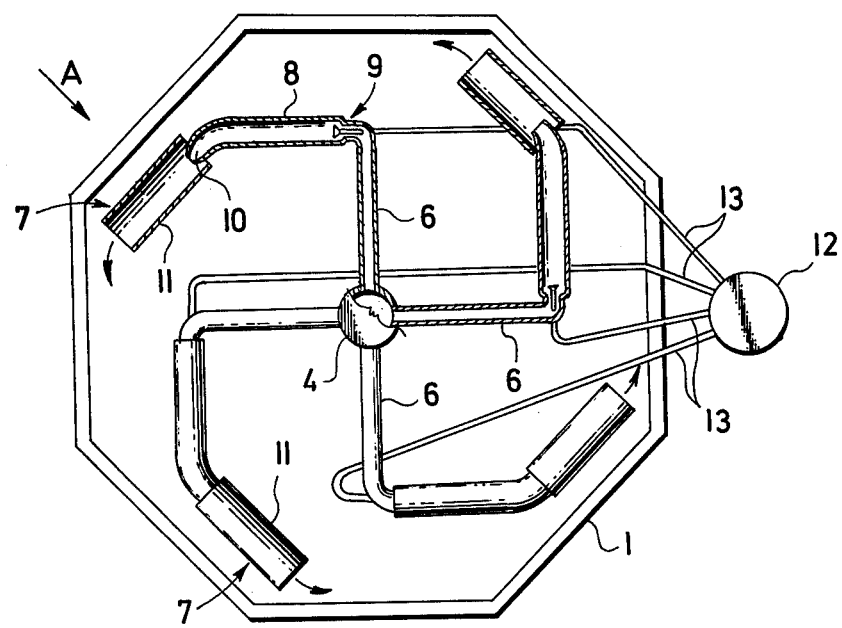
FIG. 1 is a diagrammatic plan view of the apparatus arranged in a container and equipped with four mixers.
Figure 2:
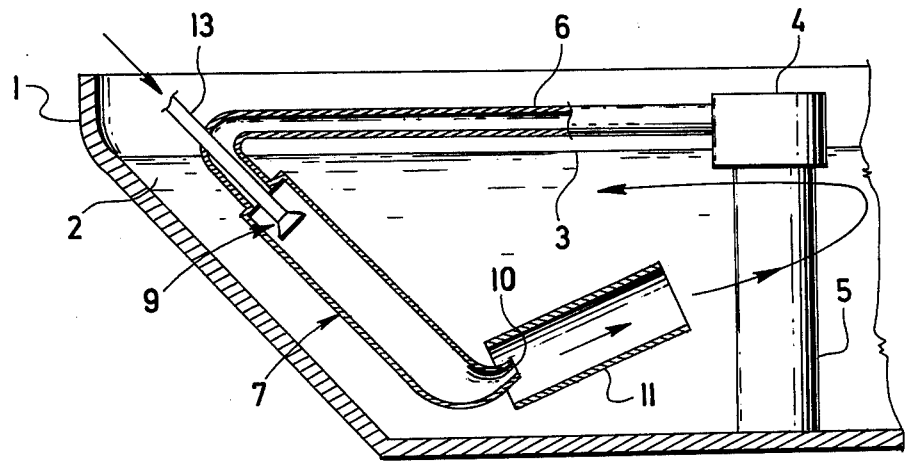
FIG. 2 shows the mixer in the direction of the arrow A from FIG. 1, partly in section and on a larger scale.

Referring first to FIGS. 1 and 2, the apparatus comprises an octagonal container 1, widening from the bottom upwards and housing the basic liquid 2 up to the level 3. Mounted in the container is a pressure source, such as a pump 4, sucking the basic liquid 2 through an intake pipe 5 and discharging it through a plurality of pipes, called supply pipes 6 in the further disclosure. In the embodiment shown the liquid is distributed from the source 4 through four supply pipes 6, but it is obvious that any desired number of such pipes may be employed.

Each supply pipe 6 leads to a mixer, generally marked with the reference numeral 7. In FIG. 1 four mixers are illustrated, but any number of such mixers may be used. Each mixer comprises a tubular body 8, whose diameter exceeds that of the supply pipe 6. In the inlet part of the tubular body 8 means producing the ring jump in the liquid stream is provided and is marked in general with the reference numeral 9. Said means can be arranged in any part of the supply pipe 6, either in its horizontal, inclined or vertical portion. The design of said means 9 is shown in detail in FIGS. 7, 8 and 9 and its operation will be disclosed later on.

The tubular body 8 is placed in the container 1 under an inclination along its wall and extends as far as the bottom of the container 1, where it is provided with a mouthpiece 10, curved and inclined upward and having a narrowing through-flow cross-section. The mouthpiece 10 leads into a tubular piece 11, open at both ends and directed upwards.

The substance to be mixed with the basic liquid 2 is supplied from a source 12, or if air has to be admixed, from the ambient atmosphere, through tubes 13 into each mixer 7, as will be explained hereinafter.

Figure 7:
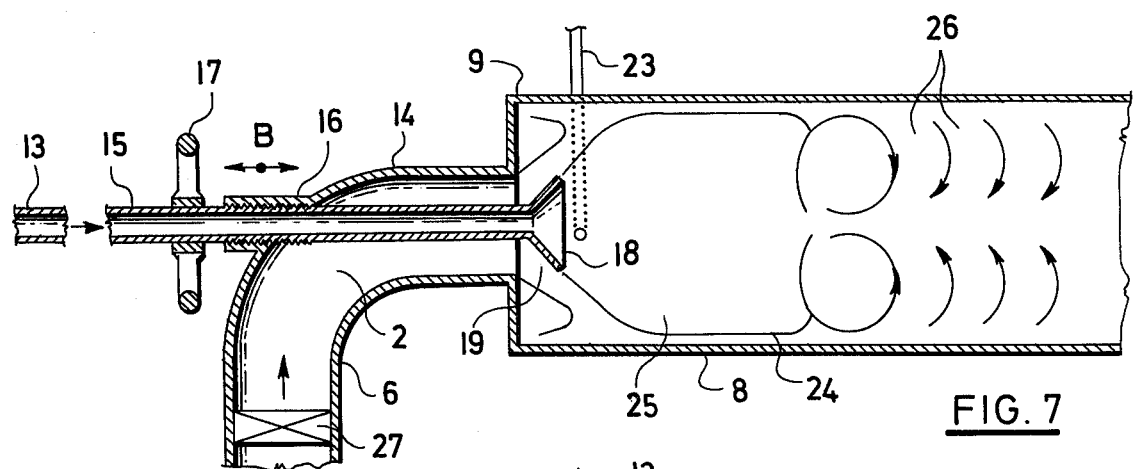
FIG. 7 is a diagrammatic view of a further embodiment showing a means producing the ring jump, illustrating its operation.

The means producing the ring jump in the liquid stream will now be described with reference to FIGS. 7, 8 and 9. The supply pipe 6, as shown in FIG. 7, merges into a tubular body 8 having a larger inner diameter, through an elbow-piece 14.

Connected to the tube 13 is a pipe 15 mounted in the elbow-piece 14 for displacement in axial direction. This displacement may be effected by any desired mechanism and only by way of example there is shown a mechanism, in which the pipe 15 is provided with a thread engaging a corresponding thread in a sleeve 16. Rigidly secured thereon is a control wheel 17, by the rotation of which the pipe 15 is displaced in one or the other axial direction, as shown by arrows B. Accomodated at the inner end of the pipe 15 is a conical body or baffle 18.

Figure 8:
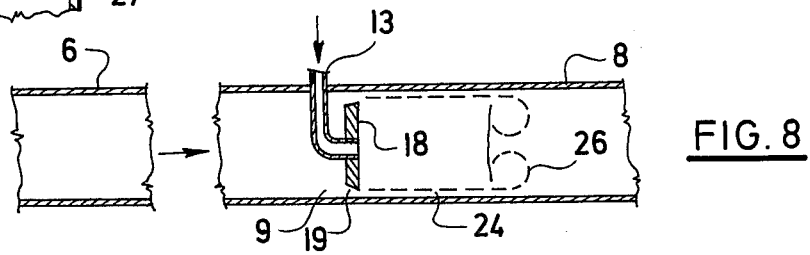

In a modified embodiment, as shown in FIG. 8, the baffle 18 has the shape of an annular plate or disc or ring, housed in the tubular body 8 of the mixer, said tubular body having in this case the same diameter as the supply pipe 6. The plate or baffle 18 has a smaller diameter than the inner diameter of the body 8, so that an annular gap is produced between its periphery and the inner wall of the tubular body 8. The tube 13 serving for the supply of the substance to be admixed leads to a central opening 20 in the baffle 18.

Figure 9:
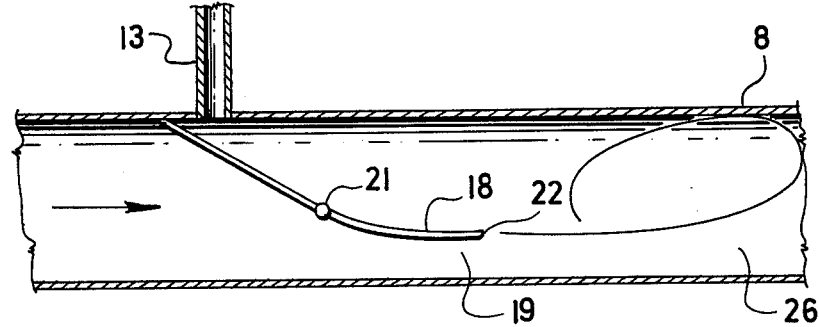
FIG. 8 is a modified arrangement of said means and FIG. 9 shows a further alternative embodiment.

FIG. 9 represents a further modification of the means 9 for producing a ring jump in the liquid stream. The baffle 18, in this case, is shaped as a deflecting plate, either rigidly secured or mounted for rocking movement on a joint 21. A gap 19 for the through-flow of the basic liquid is provided between the discharge edge 22 and the wall of the tubular body 8. The admixed substance is supplied through the tube 13.

In the embodiment, illustrated in FIG. 7, an additional tube 23, shown in dotted lines, leads into the space behind the baffle 18 and serves for the supply of still another substance to be mixed with the basic liquid. It will be obvious to those skilled in the art that a similar additional tube can be arranged in the embodiments shown in FIGS. 8 or 9.

The described apparatus operates as follows:

The basic liquid 2 flows under pressure through the supply pipe 6 and strikes the conical baffle 18. The stream of liquid passing through the gap 19 is transformed into an annular or ring-shaped flow 24, travelling along the walls of the tubular body 8 of the mixer, with the result that behind the baffle 18 there is produced a hollow core 25, filled with liquid (or another fluid, such as air or gas) supplied by the tube 13. This annular or ring flow 24 is transformed by the above disclosed ring jump in the liquid stream at the point 26 into a pressure through-flow through the full profile of the tubular body 8 and proceeds further to its discharge end. A further fluid, such as air, gas, liquid, aerosol or chemical may, if required, be fed by the tube 23 into the hollow core 25.

The ring jump, as well as its driving efficiency, may be adjusted by setting the pressure in the supply pipe 6 with the aid of a control member 27 and adjustment of the position of the conical baffle 18, i.e. by a change in the through-flow cross-section of the gap 19. The required pressure behind the ring jump is produced either by the mouthpiece 10 attached to the discharge end of the tubular body 8 or by the static pressure of the liquid column above the discharge opening or in any other way.

With the aid of the described mechanism and by the effect of the ring jump it is possible to force in the mixer 7 a gaseous or other substance into the basic liquid, to achieve a thorough mixing of the basic liquid with the admixed substance (liquid, gas, solid particles etc.) or a speedy and efficient chemical reaction.

FIG. 8 represents a modified embodiment of the means 9. Here the baffle 18, as said before, has the shape of an annular plate or disc and the ring flow 24 and ring jump are produced at the point 26, where an intense mixing of the basic liquid with the substance supplied by the tube 13 is effected.

In the alternative arrangement shown in FIG. 9, the ring jump is produced likewise at the point 26, but in this event the ring or annular flow does not extend over the full circumference of the tubular body 8, but only over a part thereof. This embodiment is advantageous when the basic liquid is heavily polluted, e.g. by fibrous materials or the like.

The mechanism for producing the ring jump is not space consuming, is extremely simple, has no movable parts, requires a minimum or no maintenance at all, while the consumption of energy in proportion to the achieved mixing effect is small. It is a further advantage, that gases or chemicals, which may be aggressive and are to be admixed to the basic liquid, are supplied into the core 25 of the ring flow, with the result that they do not come into contact with the material of the tubular body 8 until they are mixed with the basic liquid, i.e. in a highly diluted condition.

The apparatus according to FIGS. 1 and 2, which makes use of the described ring jump in combination with a new arrangement of the mixing members, operates in the following manner:

The basic liquid 2, flowing either continually into the container 1 or fed into it in doses, is introduced through the supply pipe 6 into the mixer 7. At the inlet part thereof the means 9 produces a ring jump in the liquid stream, which entrains the substance supplied by the tube 13 and causes the basic liquid 2 to be thoroughly mixed with the admitted substance, e.g. a gas. The thoroughly agitated mixture advances through the tubular body 8 of the mixer 7 to its lower end provided with the mouthpiece 10. There the mixture enters the tubular piece 11, where it entrains further quantities of the basic liquid and is mixed therewith. In the container 1 a flow is thus produced that enhances the mixing effect. This is due to the fact that the liquid discharged from the various tubular pieces 11 (according to FIG. 1 from four tubular pieces) produces in the container 1 a turbulent flow proceeding helically upward from the bottom of the container 1 towards the level 3. The turbulence thus produced results in a thorough mixing of the entire liquid 2 in the container 1 in its full volume.

Figure 3:
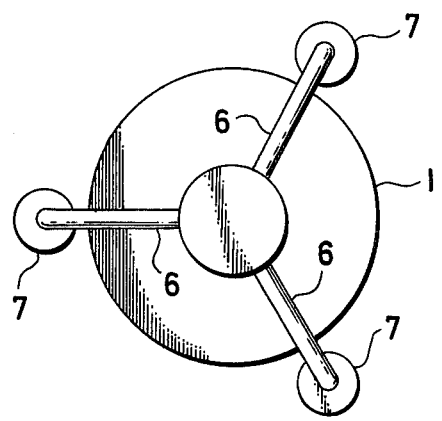
FIG. 3 is the plan view and FIG. 4 the corresponding elevational view of an apparatus arranged outside a closed container and comprising three mixers.
Figure 4:
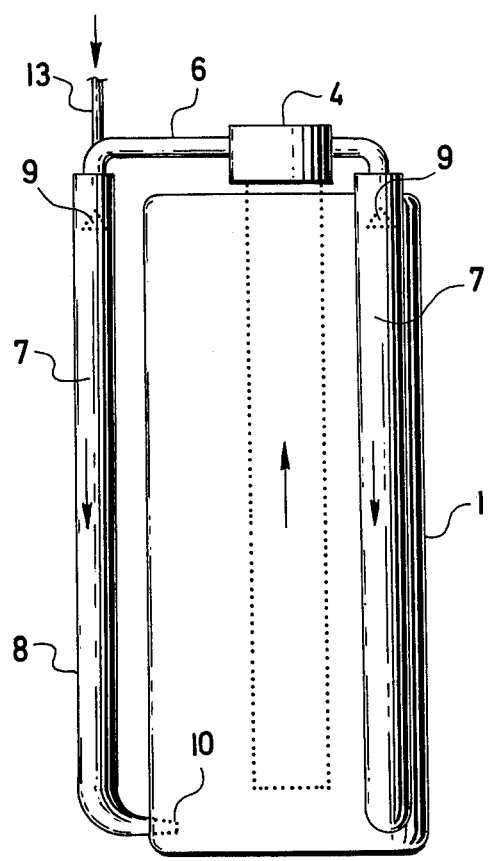

FIGS. 3 and 4 show a modified embodiment of the apparatus, which is used in connection with a closed vessel, such as a tank or column, used in the chemical industry. The closed container 1 holding the liquid to be mixed with a required chemical substance or gas, is equipped with a pump 4. Leading from the pump at the outside of the column or container 1 are supply pipes 6, in the example shown three such pipes, opening into mixers 7 arranged vertically at the outside of the container 1. The upper portion of each mixer 7 is equipped with the means 9 for producing the ring jump and is connected to a pipe 13 for the supply of the chemical substance or gas. The tubular body 8 of the mixer 7 enters the column or container 1 near its bottom, where it is provided with a mouthpiece 10 leading into the container 1 upward under an inclination and tangentially to its wall.

This last described apparatus operates in a similar way as the embodiment according to FIGS. 1 and 2. The basic liquid is pumped from the container 1 by means of the pump 4 and discharged through the supply pipe 6 into the ring jump producing means 9, by the effect of which the liquid is thoroughly mixed with the admitted chemical substance or gas and the mixture introduced at the lower end near the bottom of the container 1 through the mouthpiece 10 upwards under an inclination and tangentially in relation to the container wall. This results in a turbulent flow advancing in the container 1 helically from its bottom upwards, whereby the contents in the container 1 is perfectly mixed or the chemical reaction promoted.

Figure 5:
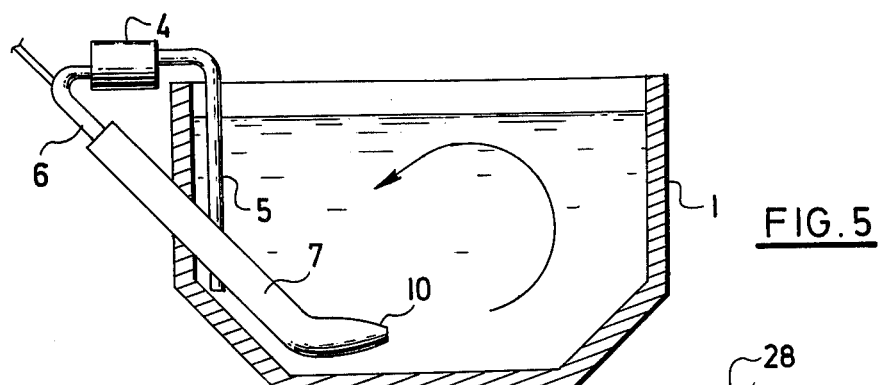
FIG. 5 is a view in axial direction of a trough-shaped container, with a mixer arranged partly outside and partly inside the container.
Figure 6:
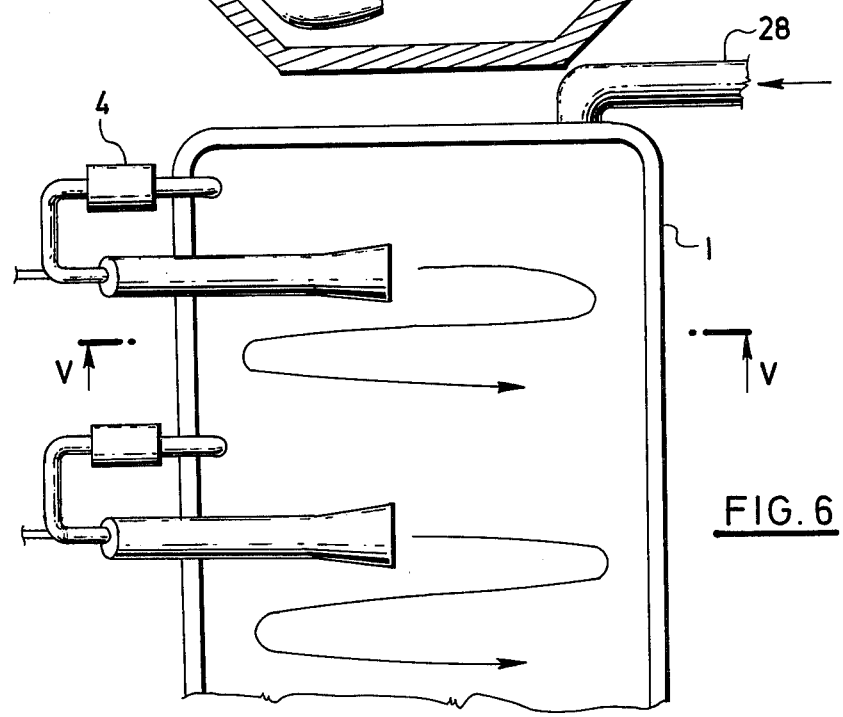
FIG. 6 is the corresponding plan view, showing the trough-shaped container with a plurality of mixers, of which only two are shown in the drawing.

FIGS. 5 and 6 represent an alternative embodiment, in which the container 1 has the shape of a trough. The basic liquid 2 is fed into the container 1 through a pipe 28 and is sucked by the pump 4 through the intake pipe 5, and discharged through the supply pipe 6 into the mixer 7. In the illustrated example the mixer 7 extends from the outside to the inside of the trough towards its bottom, it being obvious, that it can also be arranged wholly inside or outside the container; in any case its lower end is placed near the bottom of the container 1. Provided at the discharge end of the mixer 7 is again a mouthpiece 10. Also in this case the liquid, leaving the mouthpiece 10, produces a turbulent flow in the trough-shaped container 1, the flow proceeding helically in the direction of the axis O of the container 1.

It will be understood that the invention is in no way limited to the embodiments described and shown in the drawings, but can be carried into effect in various other ways. So it is not necessary, for instance, to provide a pump 4, if another pressure source is available, such as a pressure liquid supply by gravity or from a pressure column and the like.

What is claimed as new and desired to be protected by Letters Patent is set forth in the appended claims:

1. Apparatus for mixing a basic liquid with another medium, comprising in combination:
    a. a container for the basic liquid having a bottom and peripheral walls,
    b. a pressure source communicating with the interior of said container for producing a pressure stream of the basic liquid,
    c. at least one supply pipe leading from the source of pressure,
    d. at least one mixing means comprising:
    e. a tubular body having an inlet end connected to said supply pipe and an outlet end communicating with the basic liquid within and near the bottom of the container,
    f. baffle means within said tubular body in the vicinity of said inlet end of the tubular body, said baffle means occupying a substantial portion of the central part of the cross section of said tubular body, and providing a substantially annular gap between the internal surface of the tubular body and the periphery of the baffle means for directing a substantially annular flow of the basic liquid along at least a part of the internal surface of the tubular body, thereby leaving a hollow space within the annular flow in said part of the tubular body, and
    g. means for supplying another medium into said hollow space within the tubular body behind the baffle means.

2. Apparatus as claimed in claim 1, the baffle means having the shape of a conical body, the apex of which faces the incoming stream of the basic liquid.

3. Apparatus as claimed in claim 1, provided with an additional supply of pipe terminating into the hollow space of the tubular body within its part where the basic liquid flows along its internal surface only.

4. Apparatus as claimed in claim 1, the baffle means having the shape of an annular disc, the supply pipe for the other medium connected to its central opening.

5. Apparatus as claimed in claim 1, the baffle means having the shape of a deflecting plate, leaving a gap between its discharge end and the adjacent internal surface of the tubular body.

6. Apparatus for mixing a basic liquid with another medium, comprising in combination:
    a. a container for the basic liquid having a bottom and peripheral walls
    b. a pressure source communicating with the interior of said container for producing a pressure stream of the basic liquid,
    c. at least one supply pipe leading from the source of pressure,
    d. at least one mixing means comprising:
    e. a tubular body having an inlet end connected to said supply pipe and an outlet end communicating with the basic liquid within the container,
    f. baffle means in the vicinity of said inlet end of the tubular body, and providing a substantially annular gap between the internal surface of the tubular body and a portion of the baffle means for directing a substantially tubular flow of the basic liquid along at least a part of the internal surface of the tubular body, thereby leaving a hollow space in the tubular flow in said part of the tubular body g. means for supplying another medium into said hollow space within the tubular body, h. a mouthpiece having a narrowing through-flow cross section comprising the outlet end of the tubular body and i. means for adjusting the through-flow cross sectional area between the internal surface of the tubular body and the baffle means.

7. Apparatus for mixing a basic liquid with another medium, comprising in combination:
   a. a container for the basic liquid having a bottom and peripheral walls,
   b. a pressure source communicating with the interior of said container for producing a pressure stream of the basic liquid,
   c. at least one supply pipe leading from the source of pressure,
   d. at least one mixing means comprising:
   e. a tubular body having an inlet end connected to said supply pipe and an outlet end communicating with the basic liquid within the container, said tubular body terminating at its outlet end into a mouthpiece with a gradually constricted through-flow cross sectional area and directed tangentially with respect to the peripheral wall of the container with an upward inclination, adapted to produce a helically progressing motion of the liquid present in the container,
   f. baffle means in the vicinity of said inlet end of the tubular body, and providing a substantially annular gap between the internal surface of the tubular body and a portion of the baffle means for directing a substantially tubular flow of the basic liquid along at least a part of the internal surface of the tubular body, thereby leaving a hollow space in the tubular flow in said part of the tubular body
   g. means for supplying another medium into said hollow space within the tubular body and
   h. a mouthpiece having a narrowing through-flow cross section comprising the outlet end of the tubular body.

8. Apparatus for mixing a basic liquid with another medium, comprising in combination:
   a. a container for the basic liquid having a bottom and peripheral walls,
   b. a pressure source communicating with the interior of said container for producing a pressure stream of the basic liquid,
   c. at least one supply pipe leading from the source of pressure,
   d. at least one mixing means comprising:
   e. a tubular body having an inlet end connected to said supply pipe and an outlet end communicating with the basic liquid within the container,
   f. baffle means having the shape of a conical body, the apex of which faces the incoming stream of the basic liquid in the vicinity of said inlet end of the tubular body, and providing a substantially annular gap between the internal surface of the tubular body and a portion of the baffle means for directing a substantially tubular flow of the basic liquid along at least a part of the internal surface of the tubular body, thereby leaving a hollow space in the tubular flow in said part of the tubular body,
   g. means including another supply pipe for supplying another medium into said hollow space within the tubular body, said other supply pipe for the other medium terminating in the apex of the conical body of the baffle means, and
   h. a mouthpiece having a narrowing through-flow cross section comprising the outlet end of the tubular body.

9. Apparatus for mixing a basic liquid with another medium, comprising in combination:
   a. a container for the basic liquid having a bottom and peripheral walls,
   b. a pressure source communicating with the interior of said container for producing a pressure stream of the basic liquid,
   c. at least one supply pipe leading from the source of pressure,
   d. at least one mixing means disposed within the container and comprising:
   e. a tubular body inclined with respect to the vertical and having an inlet end connected to said supply pipe and an outlet end communicating with the basic liquid within the container, said outlet end being near the bottom of the container,
   f. baffle means in the vicinity of said inlet end of the tubular body, and providing a substantially annular gap between the internal surface of the tubular body and a portion of the baffle means for directing a substantially tubular flow of the basic liquid along at least a part of the internal surface of the tubular body, thereby leaving a hollow space in the tubular flow in said part of the tubular body,
   g. means for supplying another medium into said hollow space within the tubular body, and
   h. a mouthpiece having a narrowing through-flow cross section comprising the outlet end of the tubular body.

10. Apparatus for mixing a basic liquid with another medium, comprising in combination:
   a. a container for the basic liquid having a bottom and peripheral walls,
   b. a pressure source communicating with the interior of said container for producing a pressure stream of the basic liquid,
   c. at least one supply pipe leading from the source of pressure,
   d. a plurality of mixing means placed outside the container, each comprising:
   e. a tubular body having an inlet end connected to said supply pipe and an outlet end communicating with the basic liquid within the container, via a mouthpiece leading into the interior of the container near the bottom thereof and directed tangentially towards the peripheral wall of the container under an upward inclination,
   f. baffle means in the vicinity of said inlet end of the tubular body, and providing a substantially annular gap between the internal surface of the tubular body and a portion of the baffle means for directing a substantially tubular flow of the basic liquid along at least a part of the internal surface of the tubular body, thereby leaving a hollow space in the tubular flow in said part of the tubular body,
   g. means for supplying another medium into said hollow space within the tubular body, and
   h. a mouthpiece having a narrowing through-flow cross section comprising the outlet end of the tubular body.

11. Apparatus for mixing a basic liquid with another medium, comprising in combination:

a. a container for the basic liquid having a bottom and peripheral walls, in the shape of a longitudinal trough
b. a pressure source communicating with the interior of said container for producing a pressure stream of the basic liquid,
c. at least one supply pipe leading from the source of pressure
d. a plurality of juxtaposed mixing means within the container, each comprising:
e. a tubular body having an inlet end connected to said supply pipe and an outlet end communicating with the basic liquid within the container and extending toward the bottom of the container,
f. baffle means in the vicinity of said inlet end of the tubular body, and providing a substantially annular gap between the internal surface of the tubular body and a portion of the baffle means for directing a substantially tubular flow of the basic liquid along at least a part of the internal surface of the tubular body, thereby leaving a hollow space in the tubular flow in said part of the tubular body.
g. means for supplying another medium into said hollow space within the tubular body and
h. a mouthpiece having a narrowing through-flow cross section comprising the outlet end of the tubular body.

* * * * *